(12) United States Patent
Cid-Aguilar et al.

(10) Patent No.: US 7,902,097 B2
(45) Date of Patent: Mar. 8, 2011

(54) NEUTRAL GRAY GLASS COMPOSITION

(75) Inventors: Jose Guadalupe Cid-Aguilar, Monterrey (MX); Miguel Angel Kiyama-Rodriguez, Monterrey (MX)

(73) Assignee: Vidrio Plano De Mexico, S.A. De C.V., Nuevo Leon (MX)

( * ) Notice: Subject to any disclaimer, the term of this patent is extended or adjusted under 35 U.S.C. 154(b) by 240 days.

(21) Appl. No.: 12/314,299

(22) Filed: Dec. 8, 2008

(65) Prior Publication Data

US 2010/0144509 A1      Jun. 10, 2010

(51) Int. Cl.
*C03C 3/087* (2006.01)
(52) U.S. Cl. ............................................ 501/70; 501/71
(58) Field of Classification Search .................... 501/70, 501/71
See application file for complete search history.

(56) References Cited

U.S. PATENT DOCUMENTS

| | | | | |
|---|---|---|---|---|
| 5,837,629 | A * | 11/1998 | Combes et al. | 501/70 |
| 6,506,700 | B1 * | 1/2003 | Combes et al. | 501/70 |
| 6,998,362 | B2 * | 2/2006 | Higby et al. | 501/71 |
| 2002/0155939 | A1 * | 10/2002 | Seto et al. | 501/71 |
| 2003/0050175 | A1 * | 3/2003 | Seto et al. | 501/71 |

* cited by examiner

*Primary Examiner* — Karl E Group
*Assistant Examiner* — Elizabeth A Bolden
(74) *Attorney, Agent, or Firm* — Shlesinger, Arkwright & Garvey LLP

(57) ABSTRACT

The present invention is to provide a neutral gray colored glass composition that has a soda-lime-silica glass base composition containing as major colorants 0.30 to 0.70% by weight $Fe_2O_3$; 0 to 30 ppm of $Co_3O_4$; 1 to 20 ppm of Se; and 20 to 200 ppm of CuO. The glass provides an illuminant "A" light transmission greater of 65%, a total solar energy transmittance of less than or equal to 60%, a solar ultraviolet transmittance of less than 46%; a dominant wavelength from 490 nm to 600; and an excitation purity of less than 6.

10 Claims, No Drawings

NEUTRAL GRAY GLASS COMPOSITION

BACKGROUND OF THE INVENTION

A. Field of the Invention

The present invention refers to a glass composition for the commercial production of a neutral gray glass mainly for use in the automotive industry such as windshields and front sidelights, having an illuminant "A" light transmission ($T_{LA}$) greater of 65%, a total solar energy transmittance ($T_S$) of less than or equal to 60%, and a solar ultraviolet transmittance ($T_{UV}$) of less than 46%; a dominant wavelength from 490 nm to 600; and excitation purity of less than 6.

B. Description of the Related Art

Several patents have been developed for obtaining gray glass, for "automotive" purposes, having a light transmission greater to 70, which meets with the requirements of the U.S. Federal Motor Vehicle Safety Standard. For the construction industry there is not restriction and smaller values can be obtained as well as thicknesses between 1.6 and 12 mm.

The glasses disclosed in almost all the prior patents referring to a type of neutral gray glass for automotive purposes, are based on three basic components: iron oxide, cobalt oxide and selenium. These components are additionally combined with Nickel Oxide or Manganese Oxide commonly called Manganese Dioxide using different proportions and, together with the typical formulation of a soda-lime-silica glass, constitutes the basic composition of the glass.

That is the case of the glasses of the U.S. Pat. No. 7,071,133 of Arbab, et al, issued on Jul. 4, 2006, which has glass redox value from 0.2 to 0.675; the U.S. Pat. No. 6,821,918 of Boulos, et al, issued on Nov. 23, 2004 in which iron oxide, cobalt oxide selenium and manganese are used as main components. The manganese compound is present in an amount of 0.1 to 0.5 wt. % based on $MnO_2$ in the glass composition. The presence of manganese substantially prevents the formation of the amber color. This manganese compound can be added to the batch glass components in a variety forms, e.g., but not limited to $MnO_2$, $Mn_3O_4$, MnO, $MnCO_3$, $MnSO_4$, $MnF_2$, $MnCl_2$, etc.

Some other glasses disclosed in other patents, such as those mentioned in the following paragraphs use, besides the three mentioned components, different metallic elements conferring the characteristics to the final product, that allow them a $TL_A>70\%$, in order to be used in the construction and automotive industries.

That is the case of the glasses of the U.S. Pat. No. 6,114,264 of Krumwiede, et al issued on Sep. 5, 2000, wherein the color of the glass is characterized by dominant wavelengths in the range of 480 to 555 nanometers, an excitation purity of no higher than 8 percent and a luminous transmittance of 70 percent or greater at a thickness of 3.9 millimeters; the U.S. Pat. No. 6,998,362 of Higby, et al issued on Feb. 14, 2006, wherein the color of the glass is characterized by a dominant wavelength less than 560 nanometers, a color purity of no higher than 6 percent and a visible light transmission of 70 percent or greater at a thickness of 4 millimeters, and wherein the percent reduction of the total iron is between 21% and 34%; the U.S. Pat. No. 7,179,763 of Teyssedre, et al, issued Feb. 20, 2007, the glass having an overall light transmission under illuminant A greater than 67 for a glass thickness equal to 3.85 mm; and, the U.S. Pat. No. 5,958,811 of Sakaguchi, et al issued on Sep. 28, 1999, wherein an ultraviolet and infrared radiation absorbing glass composition has a visible light transmission of 70% or more as measured with the CIE standard illuminant A, when said glass has a thickness of 3.25 to 6.25 mm. The glass composition includes CoO, Se and $Fe_2O_3$ as main components, as well as, rare earths $CeO_2$ and $La_2O_3$.

The U.S. Pat. No. 6,235,666 (Cochran, et al), U.S. Pat. No. 6,403,509 (Cochran, et al), U.S. Pat. No. 6,498,118 (Landa, et al), U.S. Pat. No. 6,573,207 (Landa, et al), U.S. Pat. No. 6,521,558 (Landa, et al), U.S. Pat. No. 6,716,780 (Landa, et al), U.S. Pat. No. 7,135,425 (Thomsen, et al) and U.S. Pat. No. 7,151,065 (Thomsen, et al) are related with glasses with a luminous transmittance greater of 70 percent. Their main colorants are CoO, Se, y $Fe_2O_3$. The Se and CoO can be partially or totally substituted by a combination of rare earths such as $Er_2O_3$, $Y_2O_3$, $Ho_2O_3$, $CeO_2$. However, a disadvantage on the use of rare earth oxides in the glass compositions are the high costs.

Additionally, the U.S. Pat. No. 5,308,805 of Baker et al, issued May 4, 1994, describes a neutral gray glass having a low transmission, in which one of the claimed components is the nickel oxide in proportions of 100 to 500 ppm.

In the past, the heat absorbing gray glasses containing nickel in their structure, frequently presented inclusions of nickel in the form of sulfide which, during the melting of the glass were formed until appearing as small invisible particles which were impossible to distinguish in viewing an already formed glass. These inclusions of nickel sulfide are due to their high coefficient of thermal expansion that can cause thermal stresses sufficient to fracture a glass plate. This is a singular problem when the glass pieces are subjected to a thermal treatment as the tempering, in which the presence of the nickel sulfide causes an excessive percentage of breakdown pieces during or as a consequence of the tempering process.

An additional disadvantage of the glasses containing nickel is the change of color that they undergo after the thermal process, such as for example, after tempering.

U.S. Pat. No. 5,023,210 of Krumwide et al, issued Jun. 11, 1991, discloses a low transmission (the glass having a luminous transmittance less than 20 percent) neutral gray glass composition that does not includes nickel. In order to achieve similar characteristics to that of a neutral gray glass, Krumwide uses chromium oxide in amounts of 220 to 500 ppm as $Cr_2O_3$, in its composition which, in these proportions, produces a gray tone and adjusts the levels of selenium and cobalt oxide in order to make it a neutral tone. However, in previous references it is mentioned a preference of not using these compounds because of the problems presented by the difficulty of melting the chromium compounds (U.S. Pat. No. 4,837,206), and additionally because these have difficulties in order to discard the solid materials containing said compounds. Also, in the U.S. Pat. No. 5,308,805, there is mentioned the inconvenience of the chromium oxide used like coloring agent, since it requires the use of additional operations and apparatuses to the conventional ones into the melting furnaces in order to reach the necessary conditions to produce the desired glasses.

The U.S. Pat. No. 5,346,867 of Jones et al, issued Sep. 13, 1994, discloses a heat absorbing glass composition having a neutral gray color, which uses manganese and titanium oxide in order to increase the retention of the selenium (that is a high cost component), during the production process. The neutral gray glass having a 4 mm control thickness, a light transmittance using illuminant A of 10.0% to 55.0%. Although of previous references (U.S. Pat. No. 4,873,206), it was known that the use of the manganese has a tendency to form a yellowish-brown coloration when it is exposed to the ultraviolet radiation making it difficult to maintain the uniformity of the product, and the use of the titanium causes a yellowish coloration when the glass enters in contact with the liquid tin of the float process. This is what makes undesirable these two aspects during the production of the glass because it makes critical the control of color in order to obtain the desired tone during the manufacture. Jones et al mentioned in their patent '867, that the process of solarization is a phenomenon associated with the change of $Fe^{3+}$ to $Fe^{2+}$ which cause an undesirable change in the color, mentioning that they found that this does not occur in the disclosed glass and additionally the use of the titanium oxide is incorporated into the glass in order to obtain the desired range of dominant wave length, as well to reduce the transmission of ultraviolet radiation.

On the other hand, it is well known by the persons skilled in the art, that the addition or substitution of one or more colorants for other colorants, or the change in the relative proportional amount in the glass composition, affects not only the color of the product, as for example the dominant wave length of the color or the excitation purity, but also the luminous transmission, the heat absorption and additional properties such as the transmission of ultraviolet and infrared radiation.

It has been known that copper played an important role in the production of colored glass, ceramics and pigments. It has been recognized, for example, the coloration of the Persian ceramic for their tonality conferred by the copper. Of special interest for ceramic artists are the turquoise blue and especially the Egyptian and Persian blue dark (Woldemar A. Weil; Colored Glasses, Society of Glass Technology, Great Britain, p. 154-167, 1976).

Copper has been used in the glass compositions, not only in those of soda-lime-silica type, but also in others such as those containing, for example, borosilicate. Therefore, the developed color depends on the base of the glass, on its concentration and on its oxidation state.

For the case of the above mentioned glass as a base, the copper in the form of the oxide imparts a blue coloration of a greenish tone, specifically turquoise, however in the glass, the copper can be in its monovalent state, which does not impart color. So, the blue greenish coloration depends not only on the amount of copper present, but on the ionic balance between the cuprous and cupric states. The maximum absorption of the copper oxide is in a band centered at 780 nm and a maximum weak secondary peak is present at the 450 nm, which disappears at high soda content (around 40% weight). (C. R. Bamford, Colour Generation and Control in Glass, Glass Science and Technology, Elsevier Scientific Publishing Company, p. 48-50, Amsterdam, 1977).

In the production of red ruby glass, a mixture containing copper oxide together with any reducer agent (SnO is commonly used), is melted in reduced conditions. The initial mixture shows the blue characteristic color of the copper II, but as soon as the melting begins, changes the color to a pale straw yellow which takes place during this stage. Due to a thermal treatment to a temperature between the annealing point and the softening point, the ruby red color is developed. If, during the melt, the reduction state is carried out beyond a critical stage, the color changes to brown and appears opaque or "turned off". On the other hand, if the copper is insufficiently reduced, some traces of blue color are kept and the ruby red color is not developed (Amal Paul, Chemistry of Glasses, Chapman and Hall, p. 264-270, London, 1982).

U.S. Pat. No. 2,922,720 of Parks et al, issued Jun. 20, 1957, discloses the use of the copper in the glass as: " . . . The copper has been used as coloring agent for glass upon developing a coloration ruby red, but in order to obtain the color in a open melt furnace, it has been necessary the use of cyanogens as reducer agent . . . ", additionally mentions the effect of the copper in the coloration of the glass, as due to the colloidal suspension of particles of metallic copper in the glass, and by analogy it is believed that a particle size produces the ruby red colors, depending on the intensity of the color of the copper concentration. For smaller particle sizes, the effect of color is null.

In the present application, the incorporation of cupper oxide (CuO), in combination with the iron oxide, cobalt oxide and selenium is used as an alternative for obtaining a gray tonality with a light transmission>70% for use in the automotive industry. This avoids the intentional addition of some colorants as the nickel, manganese, $TiO_2$ or a combination of rare earths.

Furthermore, the Cobalt Oxide (expressed as $Co_3O_4$) is partially substituted by Copper Oxide (CuO) and in some examples is avoided. This substitution is possible because the CuO and the $Co_3O_4$ provides a blue tonality to the glass.

% Redox or % ferrous=% FeO (express as $Fe_2O_3$)/(% total $Fe_2O_3$)

The neutral tonality is obtained with the combination of iron oxide ($Fe_2O_3$), which causes a change of color of the glass from a yellow to yellow-green (lower redox) to a blue (higher redox), depending on the % of reduction. If redox is higher, it is possible to avoid cobalt oxide (blue) and add only selenium (coloration from pink to red-brown) and copper oxide (turquoise-blue). On the other hand, if redox is lower it is necessary a combination of Copper oxide-cobalt oxide. In the last combination, Cobalt is partially substituted by Copper.

Additionally, also is provided a reduction in the ultraviolet radiation transmission and a reduction in the near infrared region for the bands of absorption around the 800 nanometers which help to reduce the infrared solar transmission.

It has been verified that for industrial production is feasible to add CuO, in minor concentrations to 120 ppm for a glass thickness of 4.0 mm and less than 100 ppm for a glass thickness of 6.0 mm.

The glass also can be manufactured with a thickness from about 1.6 millimeters to about 12 mm. If higher concentrations of CuO are presented within of the float chamber, a reduction process in the atmosphere could be given, presenting a red coloration on the glass surface. This effect related with the residence time and to the advancing velocity of the glass ribbon can be intense and observable on the glass surface.

So that, in the present invention, a gray neutral glass composition has an illuminant "A" light transmission ($T_{LA}$) greater of 70%, a total solar energy transmittance ($T_S$) of less than or equal to 60%, and a solar ultraviolet transmittance ($T_{UV}$) of less than 46%, is achieved.

SUMMARY OF THE INVENTION

It is therefore a main objective of the present invention, to provide a neutral gray glass composition, wherein the Cobalt Oxide (expressed as $Co_3O_4$) is partially substituted by Copper Oxide (CuO), which in combination with the iron oxide and Selenium (Se), permits to obtain a neutral tone in the glass for use in the automotive and construction industry.

It is a further main objective of the present invention, to provide a neutral gray glass composition which includes additional components selected of carbon or sodium nitrate to modify the reduction state of iron.

It is an additional objective of the present invention to provide a neutral gray glass composition having an illuminant "A" light transmission greater of 65%, a total solar energy transmittance of less than or equal to 60%, a solar ultraviolet transmittance of less than 46%; a dominant wavelength from 490 nm to 600; and an excitation purity of less than 6. The glass having a % redox between about 15 to about 50.

These and other objectives and advantages of the neutral gray glass, of the present invention, will be evident to the experts in the field, from the following detailed description thereof.

DETAILED DESCRIPTION OF THE INVENTION

The typical composition of a soda-lime-silica glass used in the automotive industry, and formed by the so-called glass float process, is characterized by the following formulation based on weight percentage with regard to the total weight of the glass:

| Components | % by weight |
|---|---|
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |
| $SO_3$ | 0.05 to 0.3 |

The neutral gray glass composition of the present invention is based on the above disclosed composition soda-lime-silica, to which the following coloring compounds were added, in order to obtain a gray color.

| Components | % by weight |
|---|---|
| $Fe_2O_3$ | 0.3 to 0.7 |
| | Ppm |
| $Co_3O_4$ | 0 to 30 |
| Se | 1 to 20 |
| CuO | 20 to 200 |

The following are specific examples of soda-lime-silica composition in accordance with the present invention, having corresponding physical properties of visible, ultraviolet and infrared radiation transmittances, for a glass having a thickness of 4 mm.

Table 1

The examples 1 to 8 shows the results of the soda-lime-silica composition with the adding of iron oxide ($Fe_2O_3$), selenium (Se), cobalt oxide (expressed as $Co_3O_4$) and Copper Oxide (CuO). Sodium Nitrate ($NaNO_3$) was added as an oxidant agent in order to modify the reduction state of iron to lower values. Properties and color are for a 4.0 mm glass thickness.

Additionally a reduction in the ultraviolet radiation transmission and a reduction in the near infrared region for the bands of absorption around the 800 nanometers which help to reduce the infrared solar transmission is provided For industrial production is feasible to add CuO in minor concentrations to 120 ppm for a glass thickness of 4.0 mm and less than 100 ppm for a glass thickness of 6.0 mm.

TABLE 1

| | Example | | | | | | | |
|---|---|---|---|---|---|---|---|---|
| | 1 | 2 | 3 | 4 | 5 | 6 | 7 | 8 |
| Colorants | | | | | | | | |
| Wt % Fe2O3 | 0.60 | 0.60 | 0.60 | 0.60 | 0.60 | 0.60 | 0.60 | 0.60 |
| % REDOX (% Ferrous) | 15.2 | 16.4 | 13.7 | 12.7 | 17.3 | 18.5 | 18.1 | 19.7 |
| ppm Se | 7.8 | 6.4 | 5.8 | 2.9 | 17.5 | 11.9 | 11.5 | 7.7 |
| ppm Co3O4 | 10 | 10 | 10 | 10 | 12 | 12 | 12 | 12 |
| ppm CuO | 100 | 100 | 100 | 100 | 50 | 50 | 50 | 50 |
| Sodium Nitrate (NaNO3) | 0.6 | 0.6 | 0.6 | 0.6 | 0.6 | 0.6 | 0.6 | 0.6 |
| % UV Transmission (TUV) | 39.8 | 40.7 | 44.2 | 45.0 | 34.0 | 35.8 | 36.3 | 37.7 |
| % Illuminant A Light transmission ($T_{LA}$) | 74.6 | 73.6 | 76.1 | 78.3 | 64.7 | 71.3 | 71.3 | 72.7 |
| % Total Solar transmission (TS) | 59.9 | 58.7 | 62.6 | 64.6 | 52.8 | 55.2 | 55.8 | 55.1 |
| % Infrared transmission (T IR) | 49.4 | 47.5 | 52.5 | 54.2 | 45.3 | 43.8 | 44.8 | 41.7 |
| Transmitted Color Illuminant 'D65' Y 10o Obs. (ASTM E308) | | | | | | | | |
| L* | 89.3 | 89.0 | 90.1 | 91.3 | 84.2 | 87.5 | 87.6 | 88.5 |
| a* | −2.9 | −3.7 | −2.9 | −3.7 | −1.6 | −2.4 | −2.5 | −3.6 |
| b* | 3.1 | 1.6 | 1.6 | 0.6 | 4.4 | 4.6 | 4.2 | 2.9 |
| % Excitation purity (Pe) | 2.7 | 1.4 | 1.1 | 1.3 | 4.7 | 4.8 | 4.3 | 2.5 |
| Dominant Wavelenght (nm) | 554 | 522 | 529 | 497 | 580 | 576 | 573 | 547 |

Table 2 to 4

The examples 9 to 26 in tables 2, 3 and 4 shows the results of the soda-lime-silica composition with the adding of iron oxide ($Fe_2O_3$), selenium (Se), cobalt oxide (expressed as $Co_3O_4$) and Copper Oxide (CuO). Carbon was added as reducing agent in order to modify the reduction state of iron to higher values. The add of Sodium Nitrate ($NaNO_3$) in examples 1 to 8 and Carbon in examples 9 to 26, gave as result a gray glass with optimized values of % UV Transmission ($T_{UV}$), % of Total Solar transmission ($T_S$) and maintaining the $T_{LA}$ greater of 70%. All the glass compositions can be produced in a commercial glass floating process well know in the art.

TABLE 2

| | \multicolumn{7}{c}{Example} |
|---|---|---|---|---|---|---|---|
| | 9 | 10 | 11 | 12 | 13 | 14 | 15 |
| Colorants | | | | | | | |
| Wt % Fe2O3 | 0.62 | 0.62 | 0.62 | 0.62 | 0.62 | 0.62 | 0.62 |
| % REDOX (% Ferrous) | 25.4 | 22.3 | 22.2 | 24.3 | 21.1 | 20.9 | 20.2 |
| ppm Se | 11.3 | 4.1 | 6.8 | 7.3 | 5.2 | 6.4 | 5.3 |
| ppm Co3O4 | 12 | 12 | 12 | 12 | 10 | 10 | 10 |
| ppm CuO | 50 | 50 | 50 | 50 | 50 | 50 | 50 |
| % Carbon | 0.027 | 0.027 | 0.027 | 0.027 | 0.027 | 0.027 | 0.027 |
| % UV Transmission (T UV) | 32.4 | 39.3 | 37.1 | 34.1 | 38.1 | 38.6 | 37.9 |
| % Illuminant A Light transmission ($T_{LA}$) | 63.7 | 72.9 | 68.7 | 67.1 | 73.4 | 71.0 | 71.2 |
| % Total Solar transmission (TS) | 46.7 | 53.5 | 51.2 | 48.8 | 54.1 | 52.9 | 53.6 |
| % Infrared transmission (T IR) | 34.1 | 38.0 | 37.6 | 34.7 | 39.3 | 39.0 | 39.9 |
| Transmitted Color Illuminant 'D65' Y 10o Obs. (ASTM E308) | | | | | | | |
| L* | 84.3 | 88.9 | 86.9 | 86.1 | 89.0 | 87.9 | 88.1 |
| a* | -4.9 | -5.1 | -5.0 | -5.5 | -4.7 | -4.5 | -4.8 |
| b* | 1.7 | 1.0 | 0.8 | 1.1 | 2.1 | 1.4 | 0.9 |
| % Excitation purity (Pe) | 1.5 | 1.8 | 1.9 | 1.9 | 1.7 | 1.4 | 1.7 |
| Dominant Wavelenght (nm) | 510 | 499 | 497 | 499 | 523 | 506 | 498 |

TABLE 3

| | \multicolumn{7}{c}{Example} |
|---|---|---|---|---|---|---|---|
| | 16 | 17 | 18 | 19 | 20 | 21 | 22 |
| Colorants | | | | | | | |
| Wt % Fe2O3 | 0.62 | 0.60 | 0.60 | 0.55 | 0.55 | 0.55 | 0.55 |
| % REDOX (% Ferrous) | 20.9 | 21.9 | 20.8 | 32.4 | 36.7 | 33.0 | 38.3 |
| ppm Se | 7.8 | 5.5 | 5.6 | 9.4 | 13.1 | 3.6 | 3.9 |
| ppm Co3O4 | 10 | 5 | 5 | 0 | 0 | 0 | 0 |
| ppm CuO | 50 | 75 | 75 | 75 | 75 | 75 | 75 |
| % Carbon | 0.027 | 0.027 | 0.027 | 0.053 | 0.053 | 0.053 | 0.053 |
| % UV Transmission (T UV) | 36.8 | 41.5 | 39.3 | 39.5 | 34.4 | 42.5 | 41.8 |
| % Illuminant A Light transmission (TLA) | 69.7 | 73.1 | 73.8 | 68.8 | 62.9 | 72.8 | 70.5 |
| % Total Solar transmission (TS) | 52.5 | 53.6 | 54.6 | 45.9 | 40.4 | 47.7 | 46.0 |
| % Infrared transmission (T IR) | 39.7 | 38.4 | 39.9 | 27.9 | 23.2 | 27.2 | 26.1 |
| Transmitted Color Illuminant 'D65' Y 10o Obs. (ASTM E308) | | | | | | | |
| L* | 87.3 | 88.9 | 89.2 | 86.7 | 83.7 | 88.9 | 87.9 |
| a* | -4.5 | -4.4 | -4.4 | -4.3 | -4.7 | -5.5 | -6.0 |
| b* | 1.6 | 1.8 | 2.4 | 3.3 | 3.7 | 1.8 | 1.0 |
| % Excitation purity (Pe) | 1.3 | 1.7 | 1.5 | 2.9 | 3.2 | 1.6 | 2.2 |
| Dominant Wavelenght (nm) | 509 | 521 | 534 | 546 | 546 | 507 | 497 |

TABLE 4

| | \multicolumn{4}{c}{Example} |
|---|---|---|---|---|
| | 23 | 24 | 25 | 26 |
| Colorants | | | | |
| Wt % Fe2O3 | 0.52 | 0.52 | 0.52 | 0.52 |
| % REDOX (% Ferrous) | 39.4 | 40.3 | 38.0 | 39.0 |
| ppm Se | 8.8 | 5.1 | 2.6 | 3.8 |
| ppm Co3O4 | 0 | 0 | 0 | 0 |
| ppm CuO | 75 | 75 | 75 | 75 |
| % Carbon | 0.053 | 0.053 | 0.053 | 0.053 |
| % UV Transmission (TUV) | 40.8 | 41.1 | 44.2 | 42.0 |
| % Illuminant A Light transmission (TLA) | 69.6 | 70.3 | 73.6 | 71.3 |
| % Total Solar transmission (TS) | 45.2 | 44.9 | 47.6 | 45.7 |
| % Infrared transmission (T IR) | 25.9 | 24.6 | 26.6 | 25.1 |
| Transmitted Color Illuminant 'D65' Y 10o Obs. (ASTM E308) | | | | |
| L* | 82.0 | 84.5 | 86.5 | 85.2 |
| a* | -6.1 | -6.6 | -6.5 | -6.7 |
| b* | 2.4 | 2.1 | 1.4 | 1.6 |
| % Excitation purity (Pe) | 2.0 | 1.8 | 1.9 | 1.9 |
| Dominant Wavelenght (nm) | 523 | 511 | 502 | 504 |

In the four tables, the Cobalt Oxide (expressed as $Co_3O_4$) is partially substituted by Copper Oxide (CuO), which in combination with the iron oxide and Selenium (Se), permits to obtain a neutral tone in the glass for use in the automotive and construction industry.

The physical properties such as the light transmission correspond to calculated variables based on internationally accepted standards. So that the light transmission is evaluated using the illuminant "A" and standard Observer of 2 degree, also known as of 1931 [C.I.E Publication. 15.2, ASTM E-308 (1990)], color transmitted (L*, a* and b*) according to ASTM E308 Spectral tristimulus CIE 1964. The wave length range used for these purposes is of 380 to 780 nanometers, integrating values in numeric form with intervals of 10 nm. The solar energy transmission represents the heat which the glass achieves in direct form, evaluating it from 300 nm through 2500 nm at intervals of 5, 10, 50 nm, the numeric form of calculation uses as recognized standard ISO/DIS 13837.

The calculation of the ultraviolet radiation transmission (UV), involves only the participation of the solar UV radiation, so that it is evaluated in the range from 300 nm through 400 nm at intervals of 5 nm, the numeric form of calculation uses as recognized standard ISO/DIS 13837 or the infrared radiation transmission (IR), it is only contemplated, as well as the UV radiation, the range wherein the solar spectrum has influence, so that the range of the near Infrared region from 800 to 2500 nm, with intervals of 50 nm, is used. Both calculations use the solar radiation values of ISO/DIS 13837 above mentioned.

The amount of solar heat which is transmitted through the glass also can be calculated by the contribution of thermal energy with which participates each one of the regions wherein the solar spectrum has influence, which is from the ultraviolet region (300 nm), to the near infrared region (2500 nm), which is of 3% for UV, 44% for the visible and of 53% in order for the IR, however, the values of the direct solar energy transmission, in the present invention, are calculated on the basis of a numeric integration taking into account the whole range of the solar spectrum of 300 to 2500 nm, with intervals of 50 nm and using the values of solar radiation reported by standard ISO/DIS 13837.

The specifications for the determination of color such as the dominant wave length and the purity of excitement have been derived from the Tristimulus values (X, Y, Z) which have been adopted by the International Commission of Illumination (C.I.E.), as a direct result of experiments involving many observers. These specifications could be determined by the calculation of the three-chromatic coefficients x, y, z of the Tristimulus values that corresponding to the red, green and blue colors, respectively. The three-chromatic values are graphicated in the chromaticity diagram and compared with the coordinates of the illuminant "C" considered as illumination standard. The comparison provides the information in order to determine the color purity excitement and its dominant wave length. The dominant wave length defines the wave length of the color and its value is located in the visible range, of the 380 to 780 nm, while for the purity of excitement, the less the value is, the nearest tends to be a neutral color. A deeper understanding of these topics can be obtained form the "Handbook of Colorimetry" published by the "Massachussets Institute of Technology", of Arthur C. Hardy, issued in 1936.

From the above, a neutral gray glass composition has been described and will apparent for the experts in the art that many other features or improvements can be made, which can be considered within the scope determined by the following claims.

What is claimed is:

1. A neutral gray colored glass composition having a base portion of a soda-lime-silica composition comprising: $SiO_2$ from 68 to 75%; $Al_2O_3$ from 0 to 5%; CaO from 5 to 15%; MgO from 0 to 10%; $Na_2O$ from 10 to 18%; $K_2O$ from 0 to 5%; $SO_3$ from 0.05 to 0.30% and major colorants comprising: $Fe_2O_3$ from 0.30 to 0.70 weight percent; $Co_3O_4$ from 0 to 30 ppm; Se from 1 to 20 ppm; CuO from 20 to 200 ppm wherein the glass has an illuminant "A" light transmission greater of 65%, a total solar energy transmittance than less than or equal to 60%, a solar ultraviolet transmittance of less than 46%; a dominant wavelength from 490 nm to 600; and an excitation purity of less than 6.

2. The glass composition of the claim 1, further includes additional component selected of carbon or sodium nitrate to modify the reduction state of iron.

3. The glass composition of the claim 2, wherein carbon is from about 0.01 to about 0.07 weight percent of the glass composition.

4. The glass composition of the claim 2, wherein the sodium nitrate is added from about 0.2 to about 1.2 weight percent of the glass composition.

5. The glass composition of the claim 1, wherein said glass is produced with a thickness from about 4 millimeters to about 6 mm.

6. The glass composition of the claim 1, wherein said glass is produced with a thickness from about 1.6 millimeters to about 12 mm.

7. The glass composition of the claim 1, wherein the glass has a thickness of between 1.6 and 6 mm.

8. The glass composition of the claim 1, wherein the CuO is less to 120 ppm for a glass thickness of 4.0 mm.

9. The glass composition of the claim 1, wherein the CuO is less to 100 ppm for a glass thickness of 6.0 mm.

10. The glass composition of the claim 1, wherein the glass has a % redox from about 15 to about 50.

* * * * *